(12) United States Patent
Kaneko

(10) Patent No.: US 8,270,165 B2
(45) Date of Patent: Sep. 18, 2012

(54) ELECTRONIC APPARATUS

(75) Inventor: Takeyoshi Kaneko, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 12/791,711

(22) Filed: Jun. 1, 2010

(65) Prior Publication Data

US 2011/0026223 A1 Feb. 3, 2011

(30) Foreign Application Priority Data

Jul. 31, 2009 (JP) ................................ 2009-179519

(51) Int. Cl.
*H05K 7/20* (2006.01)
(52) U.S. Cl. ................... 361/700; 361/694; 361/695
(58) Field of Classification Search .............. 361/679.46–679.48, 679.52, 700, 361/694, 695
See application file for complete search history.

(56) References Cited

U.S. PATENT DOCUMENTS

| | | | |
|---|---|---|---|
| 7,466,548 B2 * | 12/2008 | Ishikawa | 361/698 |
| 7,551,956 B2 * | 6/2009 | Osorio et al. | 600/545 |
| 7,667,961 B2 * | 2/2010 | Fujiwara | 361/679.47 |
| 7,701,709 B2 * | 4/2010 | Tomioka et al. | 361/679.47 |
| 7,903,402 B2 * | 3/2011 | Tomioka et al. | 361/679.47 |
| 7,911,781 B2 * | 3/2011 | Chao et al. | 361/679.48 |
| 2008/0043436 A1 * | 2/2008 | Hung et al. | 361/700 |
| 2008/0074842 A1 * | 3/2008 | Tracy et al. | 361/695 |
| 2008/0123298 A1 | 5/2008 | Takeguchi et al. | |

FOREIGN PATENT DOCUMENTS

| | | |
|---|---|---|
| JP | 07-235778 | 9/1995 |
| JP | 10-207575 | 8/1998 |
| JP | 10-228335 | 8/1998 |
| JP | 3074274 U | 11/2000 |
| JP | 2006-310742 | 11/2006 |
| JP | 2007-034699 | 2/2007 |
| JP | 2007-149007 | 6/2007 |
| JP | 2007-189183 | 7/2007 |
| JP | 2007-207835 | 8/2007 |
| JP | 2007-310716 | 11/2007 |
| JP | 2007-316756 | 12/2007 |

(Continued)

OTHER PUBLICATIONS

Notifications of Reasons for Refusal, mailed on Aug. 24, 2010 in connection with corresponding Japanese Application No. JP 2009-179519.

(Continued)

*Primary Examiner* — Gregory Thompson
(74) *Attorney, Agent, or Firm* — Knobbe, Martens, Olson & Bear, LLP

(57) ABSTRACT

An electronic apparatus has a case having a bottom wall in which a first vent is formed and a circumferential wall connected to a perimeter of the bottom wall; a printed circuit board housed in the case; an electronic component which is mounted on the printed circuit board and generates heat when powered; a fan which has an air outlet and sends out a wind through the air outlet in such a direction that the wind goes away from a rotation axis of a rotor; a heat radiation member opposed to the first vent and the air outlet of the fan; and a heat pipe which is disposed between an associated part of the circumferential wall and the heat radiation member and transmits heat generated by the electronic component from the electronic component to the heat radiation member.

20 Claims, 10 Drawing Sheets

FOREIGN PATENT DOCUMENTS

JP   2007-333263   12/2007
JP   2008-130037   6/2008

OTHER PUBLICATIONS

Notifications of Reasons for Refusal, mailed on Nov. 2, 2010 in connection with corresponding Japanese Application No. JP 2009-179519.

Notifications of Reasons for Refusal, mailed on Mar. 8, 2011 in connection with corresponding Japanese Application No. JP 2011-010816.

Final Rejection, mailed on May 31, 2011 in connection with corresponding Japanese Application No. JP 2011-010816.

Notifications of Reasons for Refusal, mailed on Sep. 27, 2011 in connection with corresponding Japanese Application No. JP 2011-184672.

* cited by examiner

ELECTRONIC APPARATUS

CROSS-REFERENCE TO RELATED APPLICATION(S)

The present application claims priority from Japanese Patent Application No. 2009-179519 filed on Jul. 31, 2009, the entire content of which is incorporated herein by reference.

BACKGROUND

Aspect of the present invention relates to an electronic apparatus.

Devices for cooling an electronic component mounted on a printed circuit board are known. These cooling devices are formed by combining a heat sink and a fan. The heat sink is provided with plural heat radiation fins. For example, JP-A-2007-34699 discloses the following configuration. Heat generated by a heat generation body mounted on a main board provided inside a case is received by one heat receiving member. The heat receiving member is connected by a heat pipe to a heat exchanger which is mounted on the main board at a position that is distant from the heat receiving member. A cooling wind of a fan unit which is located beside the heat exchanger is applied to the heat exchanger, whereby heat generated by the heat generation body is dissipated to outside the case.

DESCRIPTION OF RELATED ART

However, in the conventional technique as disclosed in JP-A-2007-34699, no consideration is given to how to accommodate cases of thin electronic apparatus. In general, as a case is made thinner, a vent formed through a side wall of the case becomes smaller, which may cause reduction in cooling efficiency.

DETAILED DESCRIPTION OF EXEMPLARY EMBODIMENTS

Hereinafter, exemplary embodiments will be explained in detail with reference to the drawings. The following exemplary embodiments are examples only and do not limit the scope of the present invention as defined by the claims. In this specification, the side of the user who faces an electronic apparatus is defined as the front side and the side opposite to the user is defined as the rear side. And the top, bottom, right side, and left side are defined as viewed by the user who faces the electronic apparatus.

Figure 1:
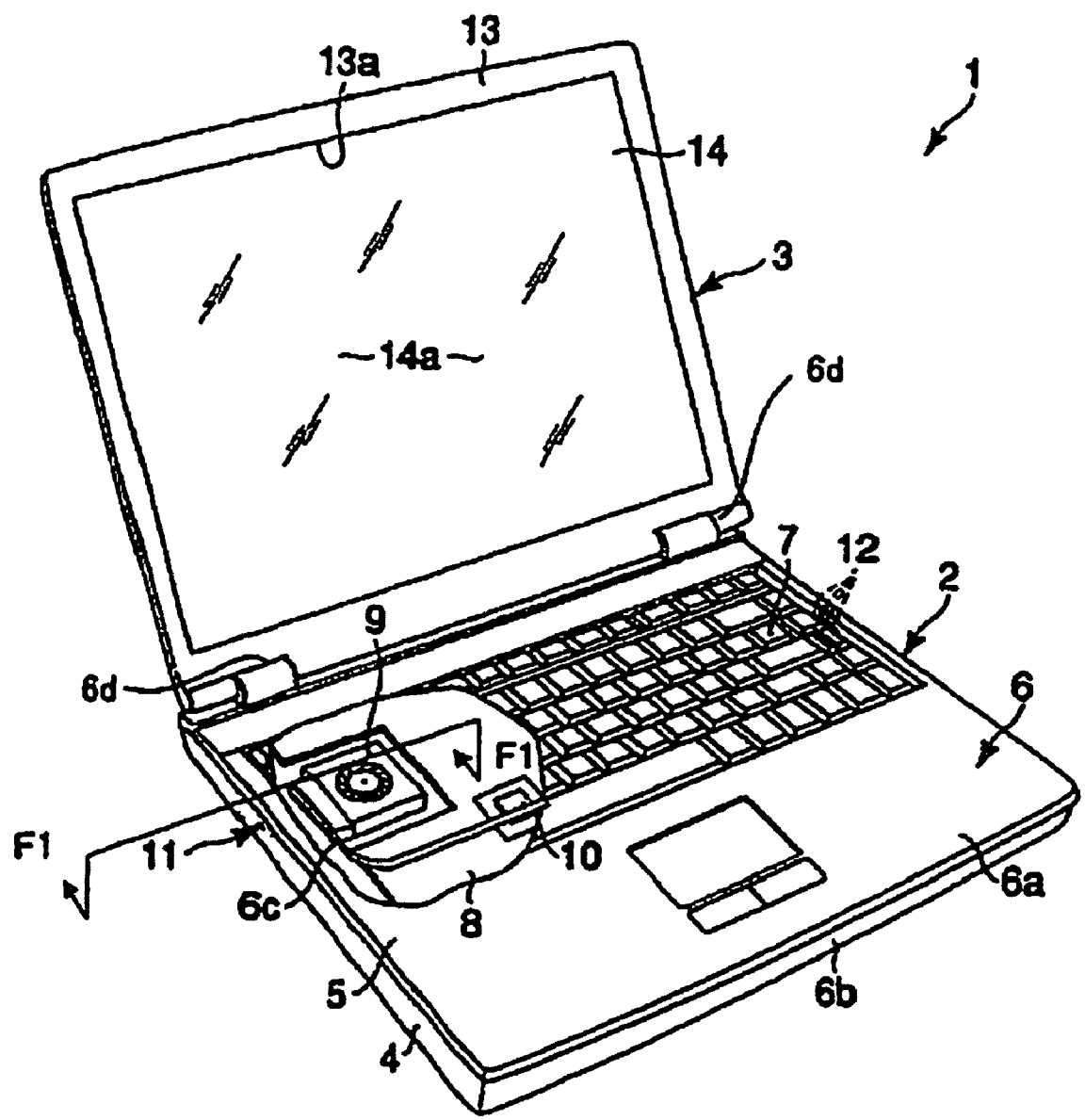
FIG. 1 shows a perspective view of a portable computer according to a first embodiment.

FIG. 1 shows a perspective view of a portable computer 1 as an electronic apparatus according to a first embodiment of the present invention. As shown in FIG. 1, the portable computer 1 is equipped with a main body 2 and a display unit 3.

The main body 2 has a main body base 4 and a main body cover 5. The main cover 5 is joined to the main body base 4 from above. The main body base 4 and the main body cover 5 constitute a case 6 of the main body 2. The case 6 has a top wall 6a, a circumferential wall 6b, and a bottom wall 6c. The top wall 6a supports a keyboard 7. The bottom wall 6c is provided with, for example, plural feet (support members) 20. As a result, when the portable computer 1 is placed on a placement surface F such as the surface of a desk with the bottom wall 6c down, a gap is formed between the bottom wall 6c of the case 6 and the placement surface F.

The case 6 houses a circuit board (printed circuit board) 8 and a cooling fan 9. The cooling fan 9 sucks air from inside the case 6 through an air inlet 9a and sends out a wind through an air outlet 9b in such a direction that the wind goes away from the rotation axis of a rotor 9c. The circuit board 8 of the embodiment has a cut 8a at a peripheral position, and the cooling fan 9 is disposed in the cut 8a. A heat generation component (electronic component) 10 is mounted on the circuit board 8 and generates heat when powered. An example of the heat generation component 10 is a CPU. The case 6 has a vent portion 11 near the cooling fan 9. The case 6 is also provided with, for example, plural air inlets 12 which open into the inside of the case 6.

The display unit 3 is equipped with a display housing 13 and a liquid crystal display panel 14 which is housed in the display housing 13. The liquid crystal display panel 14 has a display screen 14a, which is exposed to the outside through a front opening 13a of the display housing 13.

The display unit 3 is supported by a rear end portion of the case 6 by hinges 6d. Therefore, the display unit 3 can be rotated between a closed position where it is laid down so as to cover the top wall 6a and an open position where it exposes the top wall 6a.

Figure 2:
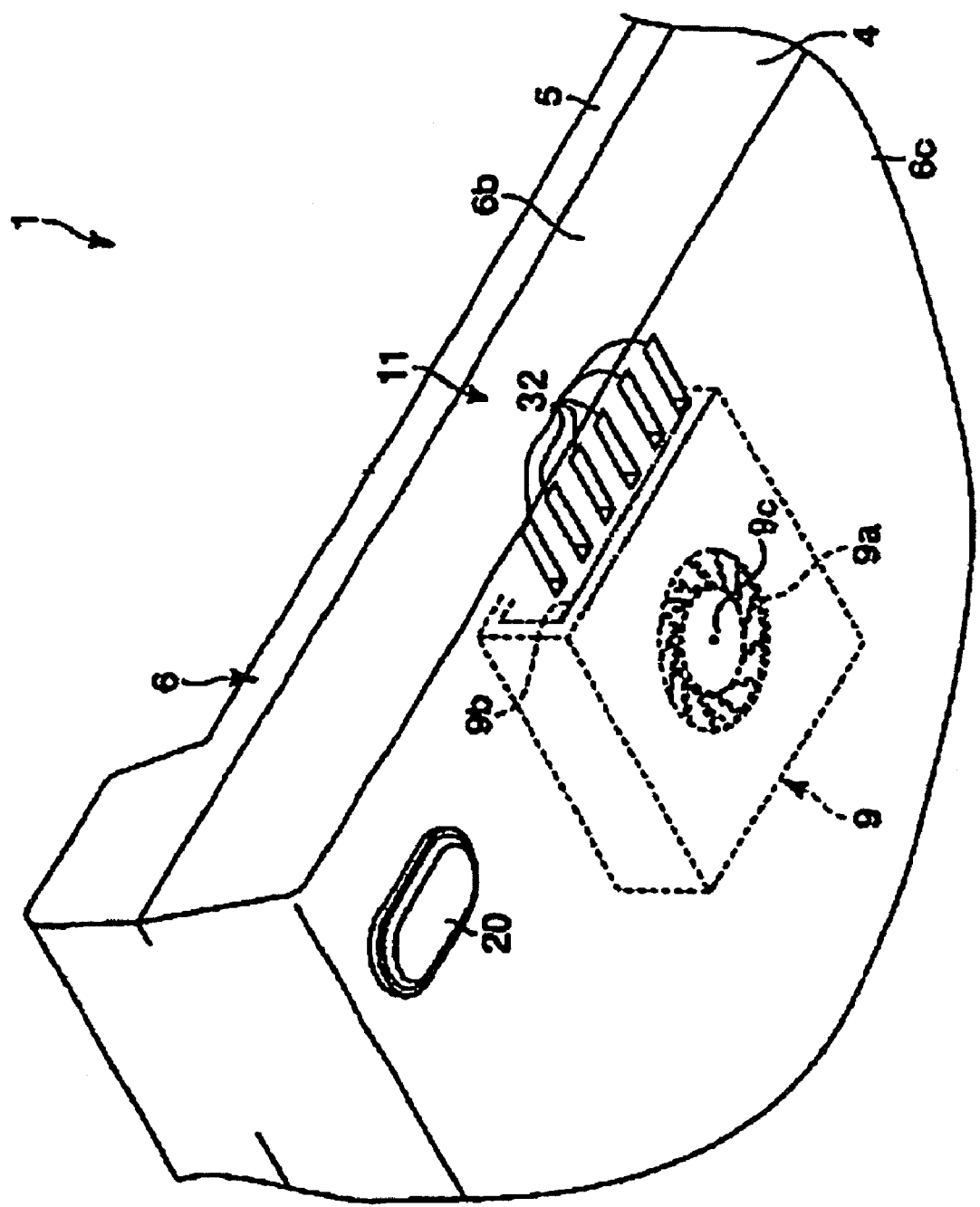
FIG. 2 shows a perspective view of a vent portion and its neighborhood of the first embodiment.
Figure 3:
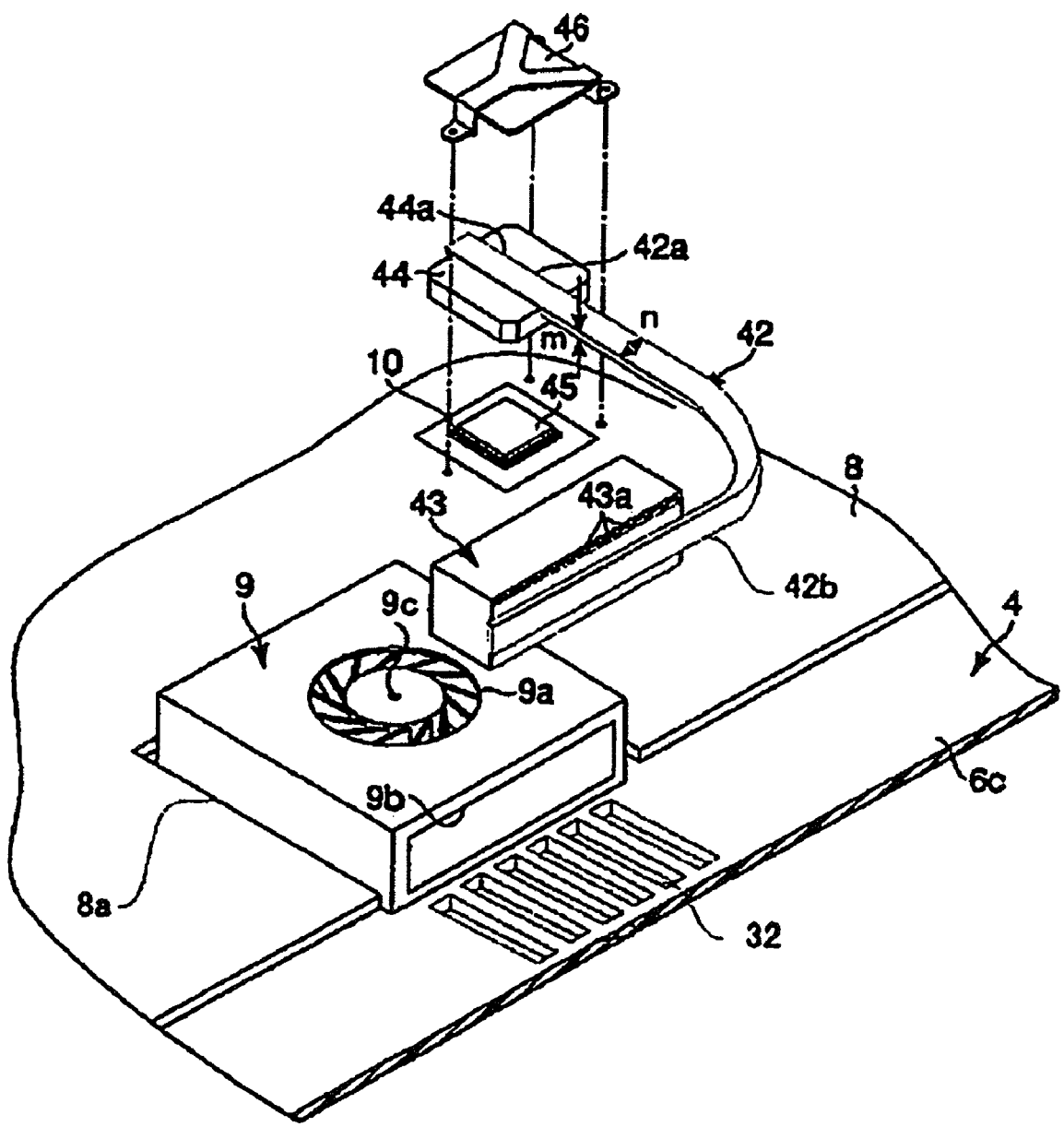
FIG. 3 shows a perspective view of an inside structure of the portable computer according to the first embodiment.
Figure 4:
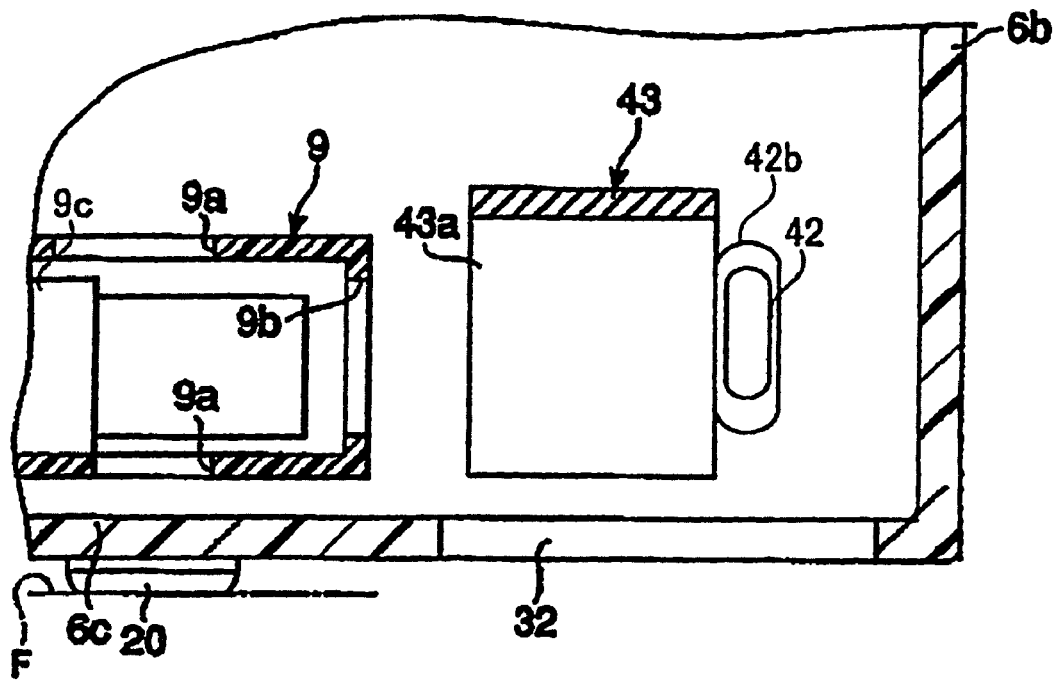
FIG. 4 shows a sectional view of the personal computer taken along line F1-F1 in FIG. 1.
Figure 5:
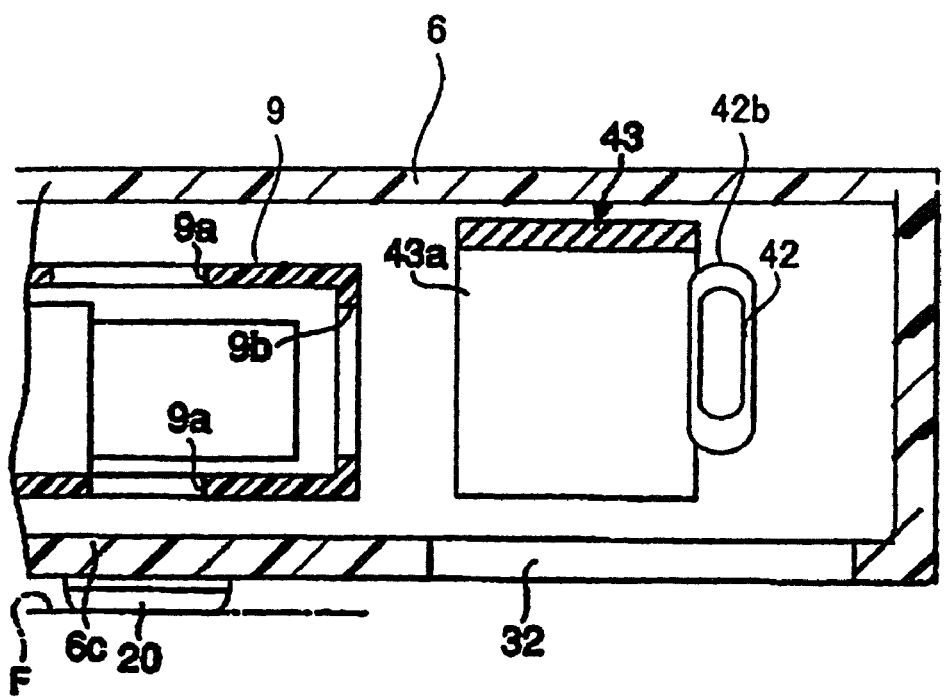
FIG. 5 shows a sectional view of a thin-design personal computer.

Next, the vent portion 11 will be described in detail with reference to FIGS. 2-4. FIG. 2 is a perspective view of the vent portion 11 and its neighborhood of the first embodiment. FIG. 3 is a perspective view of an inside structure of the portable computer 1 according to the first embodiment. FIG. 4 is a sectional view of the personal computer 1 taken along line F1-F1 in FIG. 1.

As shown in FIG. 2, the vent portion 11 is formed in part of the outer wall of the case 6 and is exposed to the outside. More specifically, the vent portion 11 is composed of part of the bottom wall 6c and vents 32 formed there.

As shown in FIG. 3, the portable computer 1 is further equipped with a heat pipe 42 and a heat radiation member 43. The heat pipe 42 is an example heat transmission member. One end portion 42a of the heat pipe 42 is thermally connected to the heat generation component 10. More specifically, the one end portion 42a of the heat pipe 42 is, for example, fitted in a groove 44a of a heat receiving block 44. The heat receiving block 44 is made of a metal, for example, and has high thermal conductivity.

The heat receiving block 44 is placed on the heat generation component 10 with a heat transmission member 45 interposed in between. Examples of the heat transmission member 45 are a grease and a heat transmission sheet. As shown in FIG. 3, the heat receiving block 44 is fixed to the circuit board 8 with a fixing member 46. In this manner, the heat pipe 42 is thermally connected to the heat generation component 10 via the heat receiving block 44.

The other end portion 42b of the heat pipe 42 is thermally connected to the heat radiation member 43. The heat radiation member 43 has plural fins 43a. For example, each fin 43a is a rectangular plate-like member. Having an operating liquid inside, the heat pipe 42 moves heat between the end portions 42a and 42b utilizing the heat of vaporization and the capillary phenomenon. The heat pipe 42 transmits heat generate by the heat generation component 10 to the heat radiation member 43.

As shown in FIG. 4, the heat radiation member 43 is disposed beside part of the circumferential wall 6b of the case 6 in such a manner that its longer sides are parallel with the part of the circumferential wall 6b. The heat radiation member 43 is disposed over the vents 32. The heat radiation member 43 is opposed to the air outlet 9b of the cooling fan 9, the part of the circumferential wall 6b, and the vents 32. Whereas the heat radiation member 43 is closed on the sides that are opposed to the top wall 6a and the part of the circumferential wall 6b by the fins 43a that are bent, a wind shield plate, etc., it is open on the side that is opposed to the bottom wall 6c. That is, in passing through the heat radiation member 43, an air flow that has been output from the air outlet 9b of the cooling fan 9 is guided so as to flow toward that portion of the bottom wall 6c which is provided with the vents 32 without flowing toward the top wall 6a of the case 6.

For example, to prevent rusting, the heat radiation member 43 may be one that has been subjected to surface treatment such as Ni plating or other coating. Or the heat radiation member 43 may be made of a metal material that is not prone to rust such as alumite.

As shown in FIGS. 3 and 4, the end portion 42b of the heat pipe 42 of the embodiment is disposed between the heat radiation member 43 and part of the circumferential wall 6b of the case 6. The end portion 42a, which is thermally connected to the heat generation member 10, of the heat pipe 42 of the embodiment is shaped in such a manner that its width m in the thickness direction of the case 6 is smaller than its width n in the direction perpendicular to the above direction; that is, the end portion 42a of the heat pipe 42 is thin in the thickness direction of the case 6. The end portion 42b, which is thermally connected to the heat radiation member 43, of the heat pipe 42 of the embodiment is shaped in such a manner that its width m in the thickness direction of the case 6 is greater than or equal to its width n in the direction perpendicular to the above direction; that is, the end portion 42b of the heat pipe 42 is thin in the direction perpendicular to the thickness direction of the case 6 or has a generally circular cross section.

Next, workings, relating to the heat dissipation, of the portable computer 1 will be described.

When the cooling fan 9 is driven, the cooling fan 9 sucks air from inside the case 6 and discharges it through the air outlet 9b. An air flow generated by the cooling fan 9 passes through the heat radiation member 43 and is discharged through the vents 32 which are formed in the bottom wall 6c.

As described above, the heat radiation member 43 is closed on the sides that are opposed to the top wall 6a and the associated part of the circumferential wall 6b are closed by the fins 43a that are bent, a wind shield plate, etc. In the embodiment, with this structure of the heat radiation member 43, an air flow generated by the cooling fan 9 does not flow toward the top wall 6a or the associated part of the circumferential wall 6b and hence does not stay in the case 6. As a result, air that has been heated by the heat generation component 10 in the case 6 is discharged from the case 6.

Heat generated by the heat generation component 10 is transmitted to the heat radiation member 43 by the heat pipe 42. While the cooling fan 9 is driven, the heat radiation member 43 receives a cooling wind coming from the cooling fan 9 and hence its heat radiation is always enhanced. Therefore, in the embodiment, the heat transmission coefficient of the heat pipe 42 is not lowered and the cooling of the heat radiation component 10 mounted in the case 6 can be accelerated.

In the portable computer 1 having the above configuration, since the vents 32 are formed through the bottom wall 6c, even in a thin design version of the case 6, the size of the vents 32 is not reduced accordingly. This makes it possible to efficiently cool the heat generation component 10 mounted in the case 6.

In the portable computer 1 according to the embodiment, since the end portion 42b of the heat pipe 42 is disposed between the heat radiation member 43 and the associated part of the circumferential wall 6b, the total mounting height is not increased unlike in the case that the end portion 42b of the heat pipe 42 is disposed over or under the heat radiation member 43. As a result, this makes it possible to accommodate a thin design version of the case 6 without reducing the size of each of the fins 43a of the heat radiation member 43.

In the configuration of the embodiment, since the end portion 42b of the heat pipe 42 is not disposed over or under the heat radiation member 43, the heat radiation member 43 can be made as long as possible in the thickness direction of the case 6 (this length is restricted by the top wall 6a and the bottom wall 6c). For example, since the cooling fan 9 sucks air from inside the case 6, the cooling fan 9 should be disposed so as to have a certain distance from at least one of the top wall 6a and the bottom wall 6c. On the other hand, the heat radiation member 43 is free of such a limitation and hence can be at least thicker than the cooling fan 9. This contributes to increase in heat radiation efficiency.

In the portable computer 1 according to the embodiment, the bottom wall 6c is provided with the plural feet 20. The portion of the bottom wall 6c where the vents 32 are formed is located between the tips (bottoms) of the feet 20 and the circuit board 8 in the thickness direction of the case 6. With this structure, when the portable computer 1 is placed on a placement surface F such as the surface of a desk with the bottom wall 6c down, a gap is formed between the bottom wall 6c of the case 6 and the placement surface F, whereby a path of an air flow to go out through the vents 32 can be secured.

The circuit board 8 of the embodiment has a peripheral portion which is opposed to the circumferential wall 6b of the case 6. The peripheral portion has the cut 8a where the edge of the circuit board 8 is more distant from the circumferential wall 6b than the other edges. In the portable computer 1 according to the embodiment, the cooling fan 9 is provided in the cut 8a of the circuit board 8, which makes it possible to reduce the thickness that is necessary for the placement of the cooling fan 9. The embodiment thus enables thinning of the case 6.

The end portion 42a, which is thermally connected to the heat generation member 10, of the heat pipe 42 of the embodiment is shaped in such a manner that its width m in the thickness direction of the case 6 is smaller than its width n in the direction perpendicular to the above direction; that is, the end portion 42a of the heat pipe 42 is thin in the thickness direction of the case 6. And the end portion 42b, which is thermally connected to the heat radiation member 43, of the heat pipe 42 is shaped in such a manner that its width m is greater than or equal to its width n; that is, the end portion 42b of the heat pipe 42 is thin in the direction perpendicular to the thickness direction of the case 6 or has a generally circular cross section.

With this structure, in the areas where the heat pipe 42 overlaps with the circuit board 8 or the heat generation component 10, the heat pipe 42 of the embodiment has a small mounting height to accommodate a thin design version of the case 6. On the other hand, in the area where the heat pipe 42 does not overlap with the circuit board 8, the heat pipe 42 of the embodiment has a small mounting width in the direction perpendicular to the thickness direction of the case 6 to accommodate a small size design version of the case 6.

Figure 6:
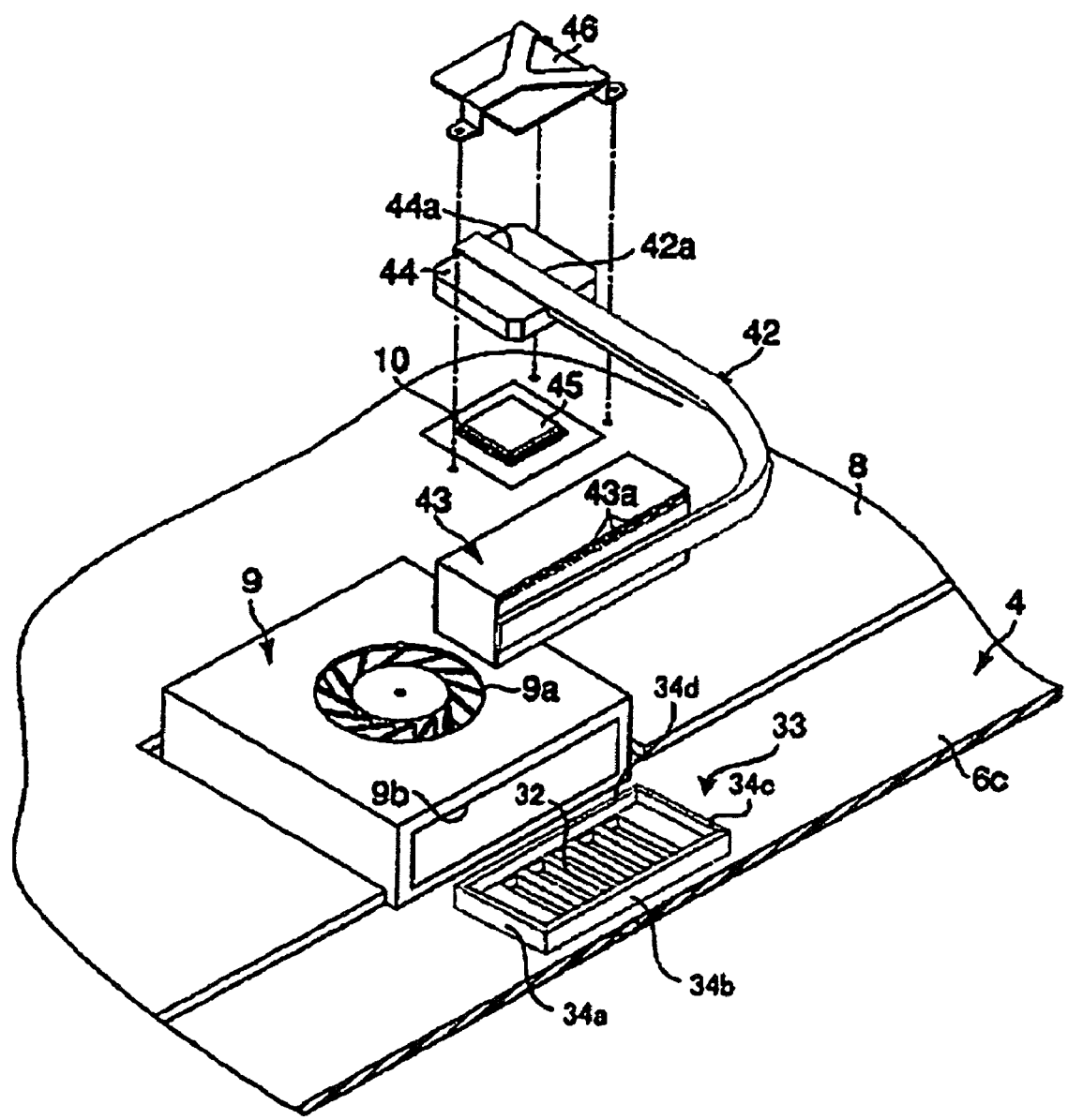
FIG. 6 shows a perspective view of an inside structure of a portable computer according to a second embodiment.
Figure 7:
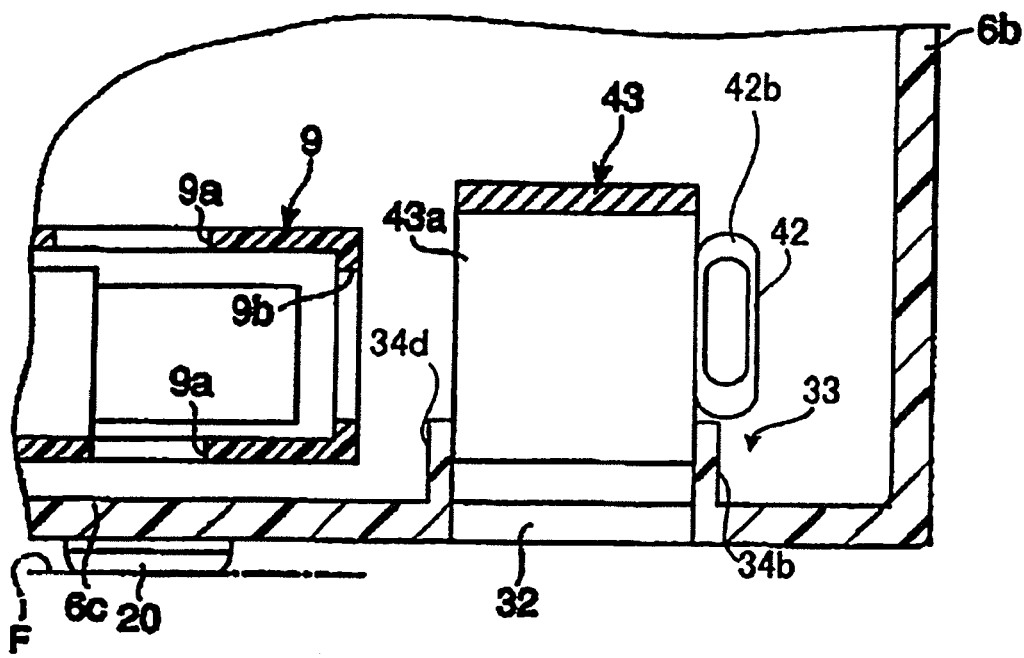
FIG. 7 shows a sectional view of the portable computer according to the second embodiment.

Next, a portable computer 31 as an electronic apparatus according to a second embodiment of the invention will be described with reference to FIGS. 6 and 7. FIG. 6 shows a perspective view of an inside structure of the portable computer 31 according to the second embodiment. FIG. 7 is a sectional view of the portable computer 31 according to the second embodiment.

The portable computer 31 as the electronic apparatus according to the second embodiment is the same as the portable computer 1 according to the first embodiment except for the structure of the bottom wall 6c of the case 6. Therefore, different features will mainly be described. To omit descriptions of common features, members having the same members in the first embodiment are given the same reference symbols as the latter. The portable computer 31 is the same in appearance as the portable computer 1 according to the first embodiment shown in FIG. 1.

As shown in FIGS. 6 and 7, the bottom wall 6c is provided with a duct 33. The duct 33 projects upward from the bottom wall 6c in the case 6. An example of the duct 33 is a rib structure which is integral with the bottom wall 6c of the case 6. The duct 33 has erect walls 34a-34d. The erect walls 34a-34d surround the heat radiation member 43 and serve as guides for guiding, to the vents 32, an air flow that has been output from the cooling fan 9 and passed through the heat radiation member 43.

With the above structure, the portable computer 31 according to the second embodiment provides not only the same advantages as the portable computer 1 according to the first embodiment does but also an advantage that a cooling wind that has been output from the cooling fan 9 and passed through the heat radiation member 43 can be guided efficiently to the to the vents 32.

Figure 8:
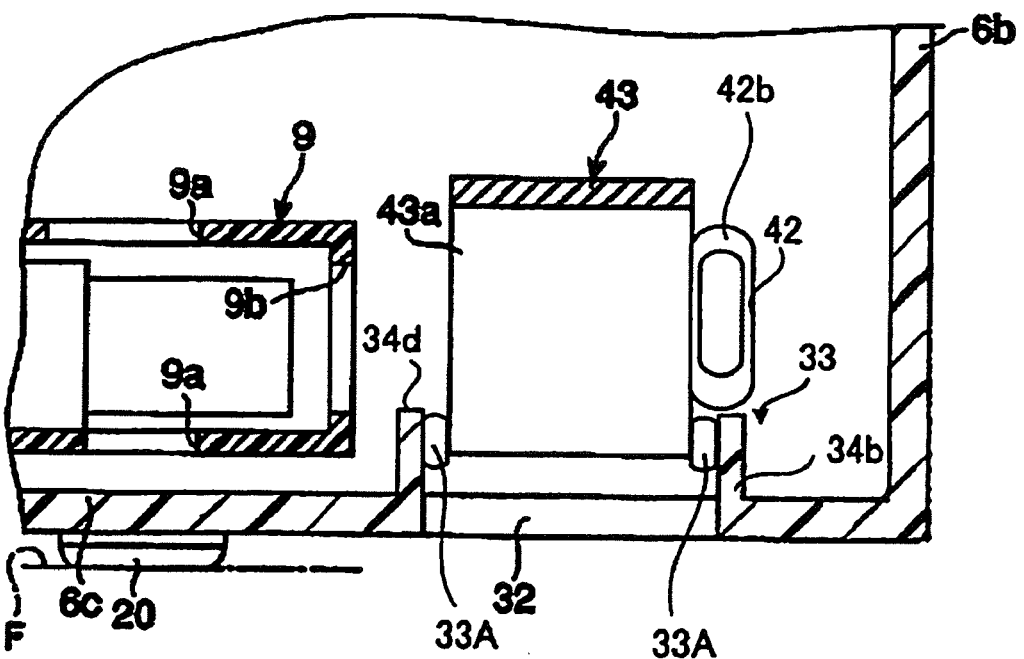
FIG. 8 shows a sectional view of a portable computer according to a modification of the second embodiment.

Next, a modification of the second embodiment will be described with reference to FIG. 8. FIG. 8 shows a sectional view of a portable computer according to the modification of the second embodiment. As shown in FIG. 8, in the modification of the portable computer 31, an elastic gasket 33A is provided between the heat radiation member 43 and the erect walls 34a-34d of the duct 33. With this structure, in the portable computer according to the modification, the gap between the heat radiation member 43 and the erect walls 34a-34d can be closed. As a result, it is prevented to occur a phenomenon that part of an air flow that has been output from the cooling fan 9 and passed through the heat radiation member 43 flows into the case 6 through the gap. A cooling wind can thus be guided to the vents 32 efficiently.

Figure 9:
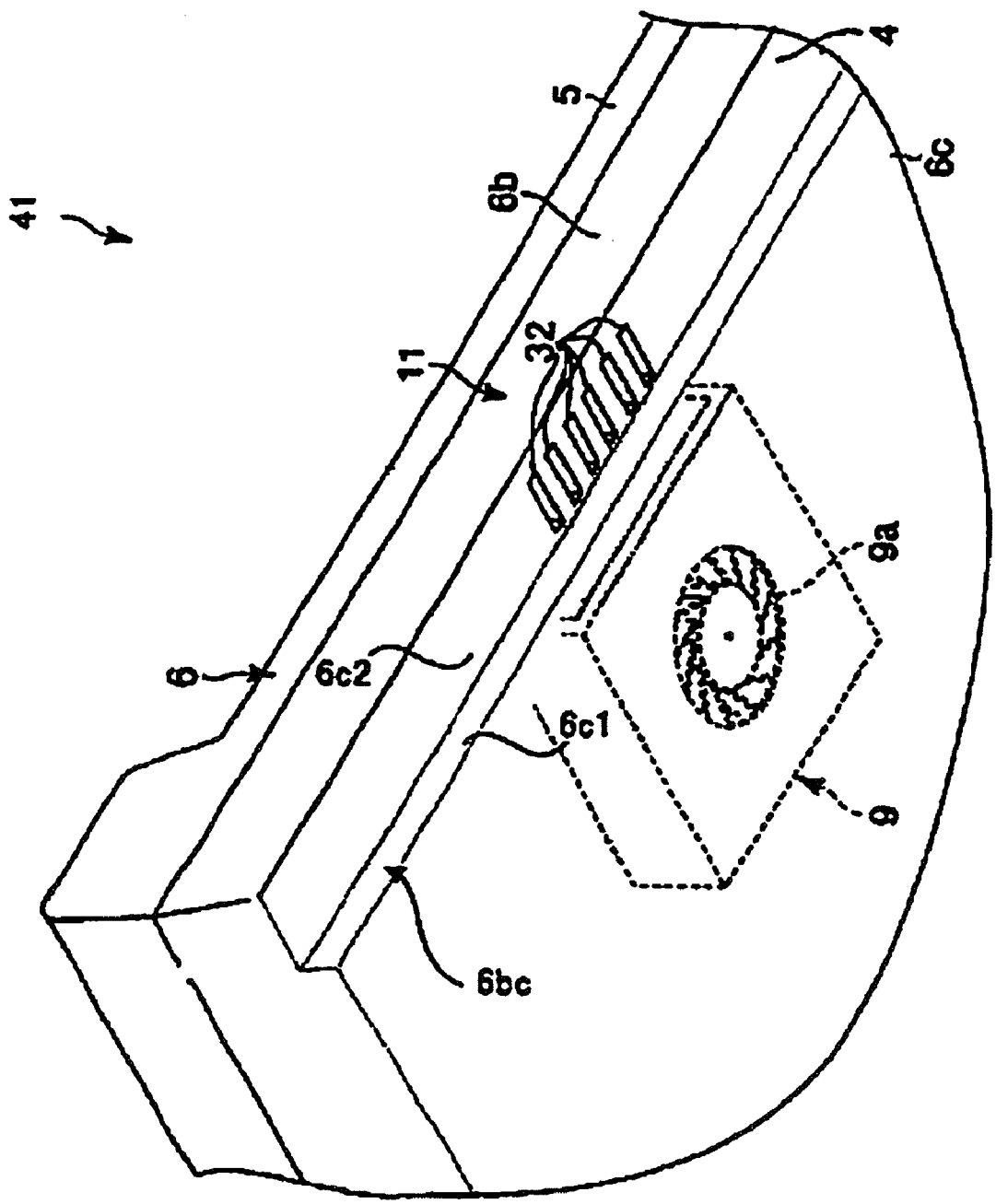
FIG. 9 shows a perspective view of a vent portion and its neighborhood of a third embodiment.
Figure 10:
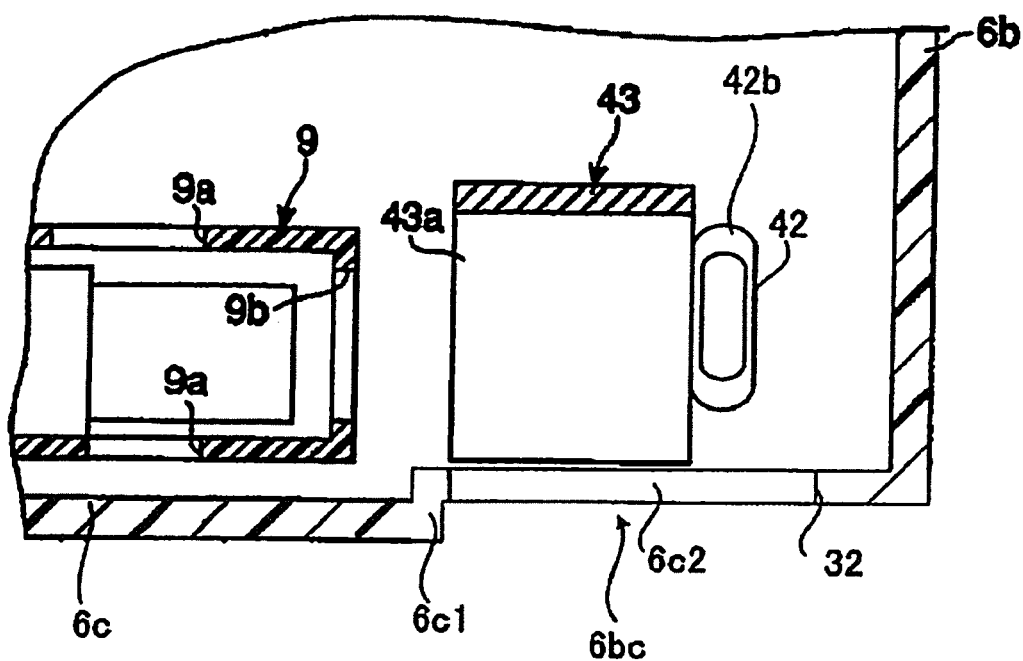
FIG. 10 shows a sectional view of a portable computer according to the third embodiment.

Next, a portable computer 41 as an electronic apparatus according to a third embodiment of the invention will be described with reference to FIGS. 9 and 10. FIG. 9 shows a perspective view of a vent portion and its neighborhood of the third embodiment. FIG. 10 shows a sectional view of the portable computer 41 according to the third embodiment.

The portable computer 41 as the electronic apparatus according to the third embodiment is the same as the portable computer 1 according to the first embodiment except for the structures of the circumferential wall 6b and the bottom wall 6c of the case 6 and the heat radiation member 43. Therefore, different features will mainly be described. To omit descriptions of common features, members having the same members in the first embodiment are given the same reference symbols as the latter.

As shown in FIG. 9, the portable computer 41 according to the third embodiment is provided with a step potion 6bc which bridges the circumferential wall 6b and the bottom wall 6c. The step portion 6bc is composed of an erect wall 6c1 which projects from the bottom wall 6c toward the top wall 6a and a second bottom wall 6c2 which connects the end, opposite to the bottom wall 6c, of the erect wall 6c1 to the circumferential wall 6b.

As shown in FIGS. 9 and 10, in the portable computer 41 according to the third embodiment, the vents 32 are formed through the second bottom wall 6c2. The heat radiation member 43 and the end portion 42b of the heat pipe 42 are disposed at such a position as to be opposed to the vents 32; that is, they are disposed between the top wall 6a and the second bottom wall 6c2.

With the above structure, the portable computer 41 according to the third embodiment provides not only the same advantages as the portable computer 1 according to the first embodiment does but also the following advantage. Even if the bottom wall 6c is not provided with the feet 20, when the portable computer 41 is placed on a placement surface F such as the surface of a desk with the bottom wall 6c down, a gap is formed between the second bottom wall 6c2 of the case 6 and the placement surface F. As a result, a path of an air flow that is discharged to the outside through the vents 32 can be secured. This makes it possible to provide a shape that is suitable for a thin design version of the case 6.

Figure 11:
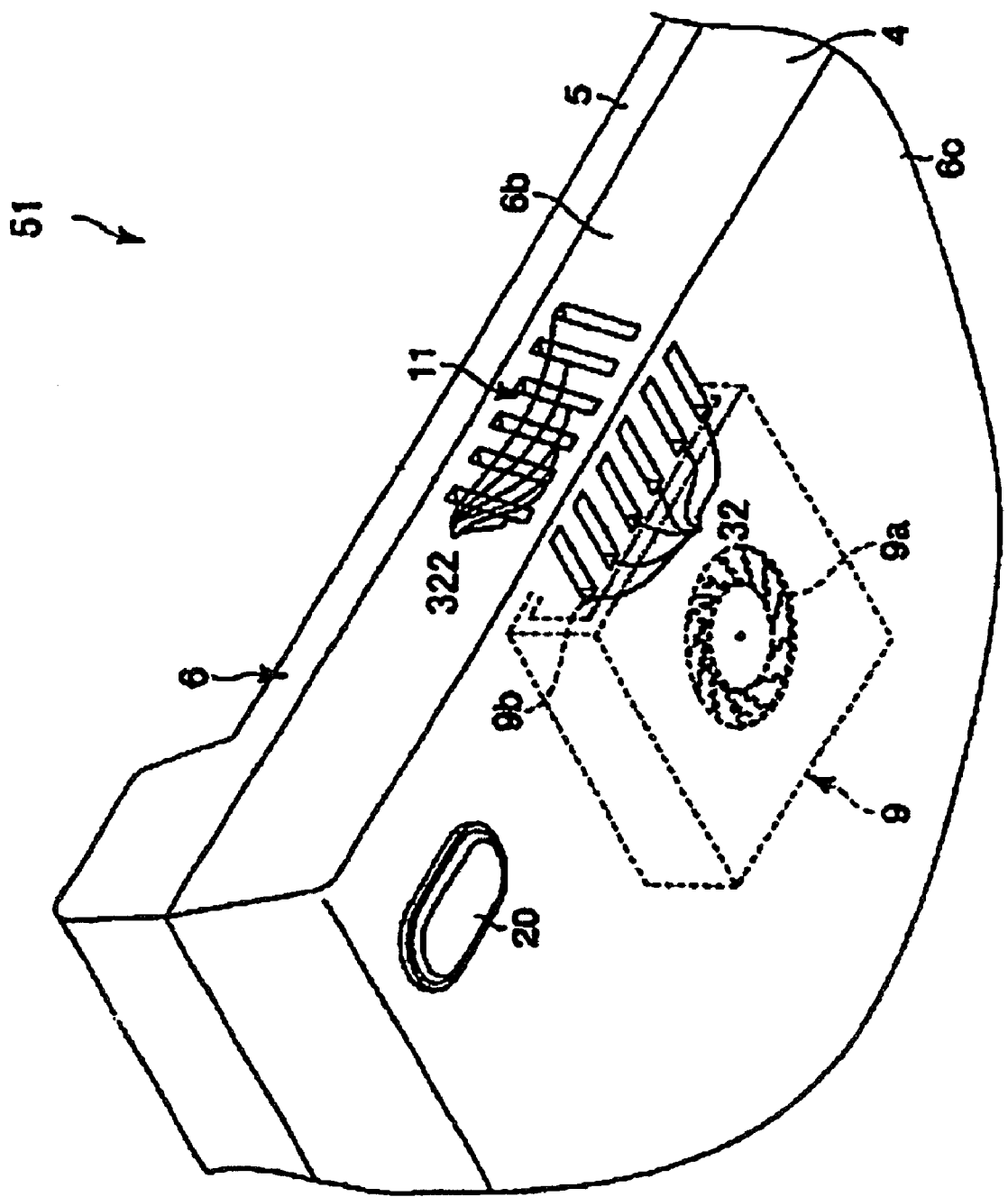
FIG. 11 shows a perspective view of a vent portion and its neighborhood of a fourth embodiment.
Figure 12:
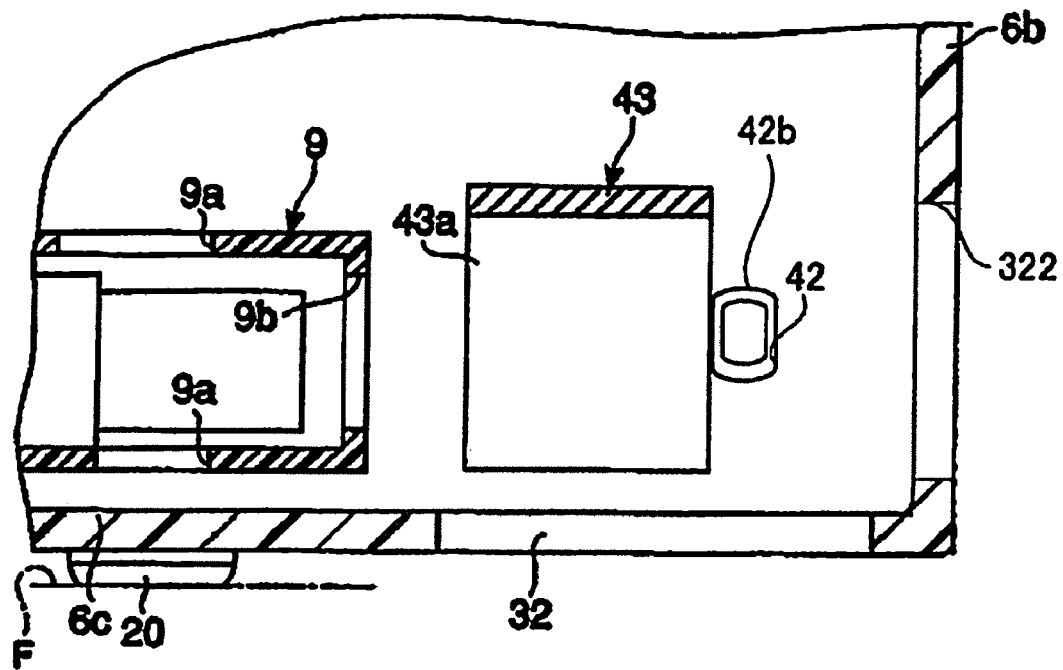
FIG. 12 shows a sectional view of a portable computer according to the fourth embodiment.

Next, a portable computer 51 as an electronic apparatus according a fourth embodiment of the invention will be described with reference to FIGS. 11 and 12. FIG. 11 shows a perspective view of a vent portion and its neighborhood of the fourth embodiment. FIG. 12 shows a sectional view of the portable computer 51 according to the fourth embodiment.

The portable computer 51 as the electronic apparatus according to the fourth embodiment is the same as the portable computer 1 according to the first embodiment except for the structures of the circumferential wall 6b of the case 6, the heat radiation member 43, and the heat pipe 42. Therefore, different features will mainly be described. To omit descriptions of common features, members having the same members in the first embodiment are given the same reference symbols as the latter. The portable computer 51 is the same in appearance as the portable computer 1 according to the first embodiment shown in FIG. 1.

As shown in FIG. 11, in the portable computer 51 according to the fourth embodiment, second vents 322 are formed through the circumferential wall 6b. Furthermore, the side, opposed to the associated part of the circumferential wall 6b, of the heat radiation member 43 of the embodiment is not closed like the side opposed to the bottom wall 6c. Therefore, an air flow that has been output from the cooling fan 9 and passed through the heat radiation member 43 flows toward the second vents 322 which are formed through the circumferential wall 6*b* as well as toward the vents 32 which are formed through the bottom wall 6*c*.

As shown in FIG. 12, the width of the end portion 42*b* of the heat pipe 42 of the embodiment in the thickness direction of the case 6 is smaller than the width of the heat radiation member 43 in the same direction and the length of the second vents 322 in the same direction. As a result, an air flow that has been output from the cooling fan 9 is not interrupted completely by the heat pipe 42 when it travels from the heat radiation member 43 to the second vents 322.

With the above structure, the portable computer 51 according to the fourth embodiment provides not only the same advantages as the portable computer 1 according to the first embodiment does but also an advantage that an air flow that has been output from the cooling fan 9 can hit the heat pipe 42 and hence the cooling efficiency can be increased further.

Figure 13:
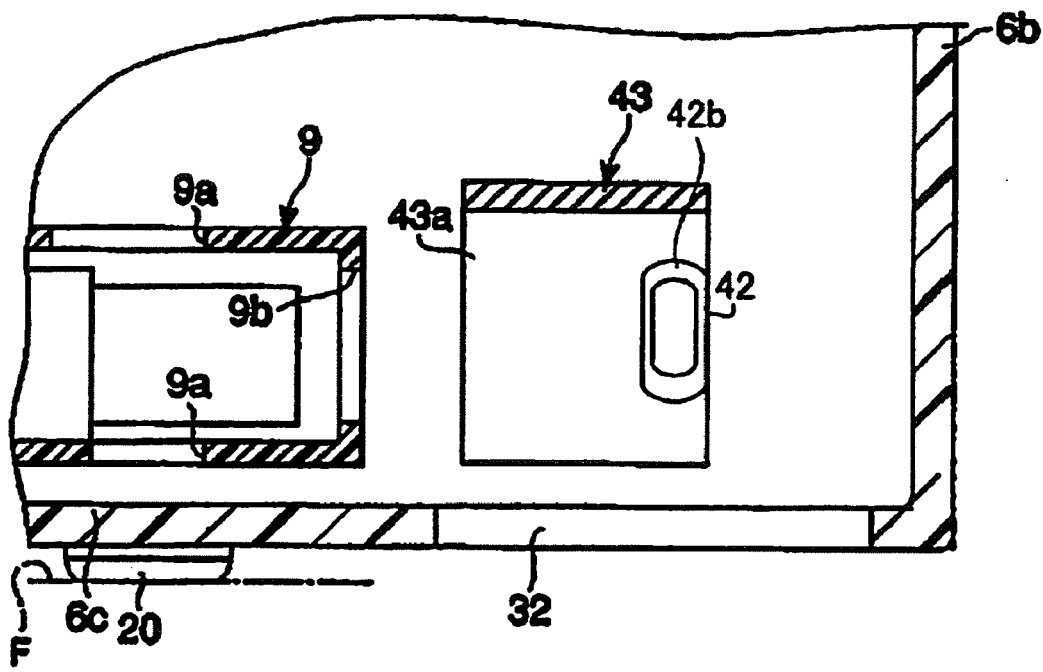
FIG. 13 shows a sectional view of a portable computer according to a fifth embodiment.

Next, a portable computer 61 as an electronic apparatus according a fifth embodiment of the invention will be described with reference to FIG. 13. FIG. 13 shows a sectional view of the portable computer 61 according to the fifth embodiment.

The portable computer 61 as the electronic apparatus according to the fifth embodiment is the same as the portable computer 1 according to the first embodiment except for the structures of the heat radiation member 43 and the heat pipe 42. Therefore, different features will mainly be described. To omit descriptions of common features, members having the same members in the first embodiment are given the same reference symbols as the latter. The portable computer 61 is the same in appearance as the portable computer 1 according to the first embodiment shown in FIG. 1.

As shown in FIG. 13, in the portable computer 61 according to the fifth embodiment, the end portion 42*b* of the heat pipe 42 is provided inside the heat radiation member 43.

With the above structure, the portable computer 61 according to the fourth embodiment provides not only the same advantages as the portable computer 1 according to the first embodiment does but also an advantage that high-density mounting inside the case 6 is enabled.

Although the portable computers according to the first to fifth embodiments and the modification of the second embodiment have been described above, the invention is not limited to them. And constituent elements of those embodiments and modification can be combined as appropriate.

A portable computer is not the only electronic apparatus to which the invention can be applied, and the invention can also be applied to various electronic apparatus such as a digital camera, a video camera, and a personal digital assistant.

What is claimed is:

1. An electronic apparatus comprising:
a case having a bottom wall in which an exhaust outlet is formed and a circumferential wall having a closed portion;
a printed circuit board housed in the case, the printed circuit board being mounted with a heat generation component;
a fan that outputs air flow towards the closed portion;
a heat radiation member that covers the exhaust outlet from inner side of the case, the heat radiation member being disposed between the closed portion and the fan; and
a heat pipe that is thermally connected to the heat generation component and the heat radiation member and covers a part of the heat radiation member from a side of the closed portion,
wherein the heat pipe is configured to redirect the air flow output from the fan toward the closed portion outside the fan to discharge the air flow from the exhaust outlet.

2. The apparatus of claim 1,
wherein the case has a support member, and
wherein a portion of the bottom wall where the exhaust outlet is formed is located between the printed circuit board and a tip of the support member in a thickness direction of the case.

3. The apparatus of claim 1,
wherein the printed circuit board comprises an edge facing apart from the circumferential wall, and
wherein the fan is provided between the edge of the printed circuit board and the circumferential wall.

4. The apparatus of claim 1, wherein the heat radiation member has a thickness that is larger than the fan in the thickness direction of the case.

5. The apparatus of claim 1 further comprising:
a wind guide member that projects from the bottom wall toward the heat radiation member and guides, to the exhaust outlet, an air flow that is output from the air outlet of the fan and passes through the heat radiation member.

6. The apparatus of claim 1,
wherein the heat radiation member has a first end facing the bottom wall and a second end located at a position opposite the first end, and
wherein the second end is provided with a wind shielding member that blocks an air flow that is output from the air outlet of the fan.

7. The apparatus of claim 1, wherein a thickness of a portion of the case where the heat radiation member is provided is larger than another portion of the case where the fan is provided.

8. An electronic apparatus comprising:
a case having a bottom wall in which an exhaust outlet is formed and a circumferential wall having a closed portion;
a printed circuit board housed in the case, the printed circuit board being mounted with a heat generation component;
a fan that outputs an air flow toward the closed portion from an air outlet that is opened toward a different direction from the exhaust outlet;
a heat radiation member that covers the exhaust outlet from inner side of the case, the heat radiation member being disposed between the closed portion and the fan; and
a heat pipe that is thermally connected to the heat generation component and the heat radiation member and covers a part of the heat radiation member from the closed portion.

9. The apparatus of claim 8,
wherein the case has a support member, and
wherein a portion of the bottom wall where the exhaust outlet is formed is located between the printed circuit board and a tip of the support member in a thickness direction of the case.

10. The apparatus of claim 8,
wherein the printed circuit board comprises an edge facing apart from the circumferential wall, and
wherein the fan is provided between the edge of the printed circuit board and the circumferential wall.

11. The apparatus of claim 8, wherein the heat radiation member has a thickness that is larger than the fan in the thickness direction of the case.

12. The apparatus of claim 8 further comprising:
a wind guide member that projects from the bottom wall toward the heat radiation member and guides, to the exhaust outlet, an air flow that is output from the air outlet of the fan and passes through the heat radiation member.

13. The apparatus of claim 8,
wherein the heat radiation member has a first end facing the bottom wall and a second end located at a position opposite the first end, and
wherein the second end is provided with a wind shielding member that blocks an air flow that is output from the air outlet of the fan.

14. The apparatus of claim 8, wherein a thickness of a portion of the case where the heat radiation member is provided is larger than another portion of the case where the fan is provided.

15. An electronic apparatus comprising:
a heat radiation member that is thermally connected to a heat generation component;
a fan that outputs air flow toward the heat radiation member;
a heat pipe that is thermally connected to the heat radiation member and covers a part of the heat radiation member from a side opposite the fan; and
a case comprising:
a circumferential wall that shields the air flow that passed through the heat radiation member in a direction of an arrangement of the heat radiation member and the fan; and
a bottom wall that extends between the circumferential wall and the fan, the bottom wall comprising an exhaust outlet opened at a portion facing the heat radiation member from a direction different from the circumferential wall and the fan,
wherein the case is configured to house the heat radiation member and the fan.

16. The apparatus of claim 15,
wherein the case has a support member, and
wherein a portion of the bottom wall where the exhaust outlet is formed is located between the printed circuit board and a tip of the support member in a thickness direction of the case.

17. The apparatus of claim 15, wherein the heat radiation member has a thickness that is larger than the fan in the thickness direction of the case.

18. The apparatus of claim 15 further comprising:
a wind guide member that projects from the bottom wall toward the heat radiation member and guides, to the exhaust outlet, an air flow that is output from the air outlet of the fan and passes through the heat radiation member.

19. The apparatus of claim 15,
wherein the heat radiation member has a first end facing the bottom wall and a second end located at a position opposite the first end, and
wherein the second end is provided with a wind shielding member that blocks an air flow that is output from the air outlet of the fan.

20. The apparatus of claim 15, wherein a thickness of a portion of the case where the heat radiation member is provided is larger than another portion of the case where the fan is provided.

* * * * *